(12) United States Patent
Weiner (10) Patent No.: US 9,965,378 B1
(45) Date of Patent: May 8, 2018

(54) MEDIATED FAULT INVOCATION SERVICE

(71) Applicant: Amazon Technologies, Inc., Seattle, WA (US)

(72) Inventor: Isaiah Clark Weiner, Orinda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 15/084,426

(22) Filed: Mar. 29, 2016

(51) Int. Cl.
- *G06F 11/00* (2006.01)
- *G06F 11/36* (2006.01)
- *H04L 29/08* (2006.01)
- *G06F 11/22* (2006.01)

(52) U.S. Cl.
CPC ...... *G06F 11/3684* (2013.01); *G06F 11/2221* (2013.01); *G06F 11/3672* (2013.01); *G06F 11/3688* (2013.01); *H04L 67/02* (2013.01)

(58) Field of Classification Search
CPC ............. G06F 11/2221; G06F 11/3672; G06F 11/3684; G06F 11/3688
See application file for complete search history.

(56) References Cited

U.S. PATENT DOCUMENTS

| 7,890,810 B1 * | 2/2011 | Coatney | G06F 11/2221 |
| | | | 714/41 |
| 2006/0265578 A1 * | 11/2006 | Modave | G06F 11/28 |
| | | | 712/245 |
| 2011/0274271 A1 * | 11/2011 | Benteo | G06F 7/723 |
| | | | 380/30 |
| 2011/0296242 A1 * | 12/2011 | Elnozahy | G06F 11/3672 |
| | | | 714/26 |
| 2012/0155285 A1 * | 6/2012 | Smart | H04L 12/40169 |
| | | | 370/242 |
| 2014/0259173 A1 * | 9/2014 | Parcel | G06F 21/577 |
| | | | 726/25 |

\* cited by examiner

*Primary Examiner* — Charles Ehne
(74) *Attorney, Agent, or Firm* — Thorpe North & Western, LLP.

(57) ABSTRACT

A technology is provided for mediated fault invocation in computing service environment. A service request that is directed to a virtualized service may be received from a calling process. The service request may be received at a user-controlled fault injection service and the virtualized service is located in a service provider environment. A determination may be made whether to modify or fail the service request as received by the user-controlled fault injection service. The service request may be blocked when the service request has been selected to fail. The service request may be sent to a virtualized service in a service provider environment or an emulated service controlled by the user-controlled fault injection service when the service request has been modified. The results of the service request may be reported to the calling process as received via the user-controlled fault injection service.

20 Claims, 9 Drawing Sheets

MEDIATED FAULT INVOCATION SERVICE

BACKGROUND

Computing systems may be found in the workplace, at home, or at school. Computing systems may include computing and data storage systems to process and store data. Some computing providers have begun offering centralized virtual computing options that may reduce overall costs, improve availability, improve scalability, and reduce time to deploy new applications. For example, some computing systems may act as a service that provides virtual computing, virtual storage, virtual networking and other virtual services as purchased for variable periods or on a pay-per-use basis (e.g., pay for a certain amount of API (application program interface) transactions or bandwidth volume) from large pools of re-purposable, multi-tenant computing resources or services. However, the testing of virtualized computing services may be challenging due to the number of services that may be used and the overall complexity of virtualized computing systems. Testing of virtualized services is also challenging because such virtualized services are shared between many customers, and as a result, there is a lack of the ability to have a virtualized service fail upon request in testing circumstances for shared tenant virtualized computing systems.

DETAILED DESCRIPTION

This technology relates to providing a mediated fault invocation service to enable on-demand fault testing in a service provider environment. In one aspect, a customer's device, service, or an application may be configured to make requests (e.g., service requests) to a service (e.g., a web enabled virtual services) and/or persistent storage devices in the service provider environment, and the service provider environment may provide a variety of services to the customer, the application, or other services. The customer's device, service, or application may communicate with the service being called via an interface, such as an application programming interface (API), which may be a web services interface, remote procedure call (RPC) interface, block system interface, file system interface, or any other type of protocol to communicate with a service. For example, the persistent storage devices may include, but are not limited to, ephemeral storage systems/devices, block storage systems/devices, object storage systems/devices, and/or file system storage systems/devices. Moreover, in one aspect, the persistent storage devices may include object storage systems that use a hypertext transfer protocol (HTTP) based API and/or RPC based API.

A stand-alone, mediated fault invocation service may mediate the service requests that are made and may provide on-demand simulated failures or modifications of the service requests. The on-demand failures or modifications to the service requests may test failures and/or modifications to the service requests destined for the web enabled services. In one aspect, the mediated fault invocation service for API requests may be a stand-alone application on a server emulating a service interface and/or service endpoints (e.g., emulating a block storage device) and the mediated fault invocation service may intentionally fail, drop, and/or modify service requests for service requests received at the mediated fault invocation service. In one aspect, for persistent storage devices (e.g., block devices, elastic block storage services, mass block storage services, mass storage devices, file storage systems, object storage systems, etc.) the mediated fault invocation service may emulate the persistent storage device by emulating the persistent storage device operations using a local operating system for storing a state of the persistent storage device (e.g., the state of the data written to the persistent storage device and the state of the persistent storage device itself) and enabling a customer to directly change the recorded state of the emulated persistent storage device. For example, the mediated fault invocation service may use a modified operating system (OS) kernel module (e.g., a testing kernel) of a computing instance on a hypervisor to emulate the persistent storage device by emulating the persistent storage device operations and enabling a local operating system interface to be used for changing a state of the persistent storage device. The emulated persistent storage device may demonstrate properties that are similar to the persistent storage device (e.g., a native virtualized block volume) to emulate reads and writes in a test state. Data may be optionally persisted in dynamic random access memory (DRAM), a physical storage device, or another accessible persistent storage device. In one aspect, the mediated fault invocation service may use one or more communication protocols, communication rules or parameters, and/or protocol layers for communicating with an operating system of the kernel module.

In one aspect, the present technology provides for mediated fault invocation in a computing service environment. A service request that is directed to a virtualized service, may be received from a calling process. The service request may be received at a user-controlled fault injection service and the virtualized service may be located in a service provider environment. A determination may be made at the fault injection service whether to modify or fail the service request as received by the user-controlled fault injection service. In one case, the service request may be blocked or dropped when the service request has been selected to fail. In another case, the service request may be sent to a virtualized service in a service provider environment or an emulated service (e.g., controlled by the user-controlled fault injection service) when the service request has been modified. The results of the service request, as received from a virtualized service or emulated service, may be reported to the calling process as received via the user-controlled fault injection service.

Figure 1:
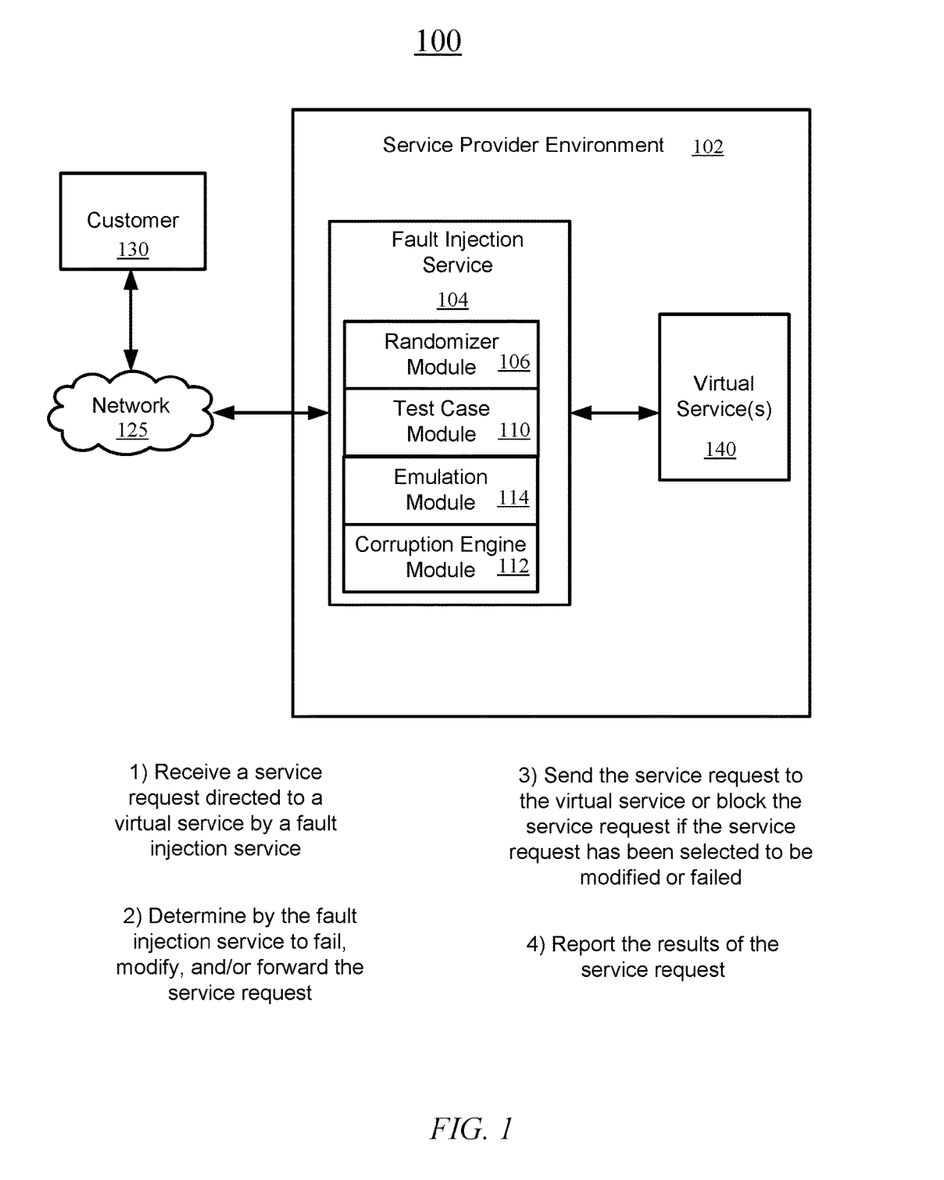
FIG. 1 illustrates a system for mediated fault invocation for virtualized services in a service provider environment according to an example of the present technology.

FIG. 1 illustrates a system 100 for a mediated fault invocation service for a virtualized service in a service provider environment 102 according to an example of the present technology. The system 100 may include a customer 130 (e.g., the customer 130 may include or be a calling service, calling process or calling application), a network 125, and a service provider environment 102, which may provide virtualized computing services (i.e., virtualized computing, virtualized storage, virtualized networking, etc.) to the customer 130 (e.g., a requesting service such as for example, a web application). More specifically, the service provider environment 102 may provide virtualized computing, virtualized storage, virtualized networking and other virtualized services that are executing on a hardware substrate. Also, the service provider environment 102 may provide data communication between the customer 130 by way of the network 125 that may include a physical network (e.g., the internet) and/or a virtual network that is within the service provider environment 102 or other suitable networks, etc. The service provider environment 102 may include a fault injection service 104 and a virtual service 140. Alternatively, the fault injection service 104 may be a stand-alone system remote from the service provider environment 102, and/or the fault injection service 104 may be located at the customer 130 data center or "on-premises".

The fault injection service may include a randomizer module 106, a test case module 110, an emulation module 114, and a corruption engine module 112. The fault injection service 104 may be in data communication with the customer 130 by way of the network 125 and the virtual service. Alternatively, the fault injection service 104 may be included with the virtual service 140. In operation, by way of example only, a service request (e.g., an API (application program interface) call) that is directed to the virtualized service 140 may be received, by the fault injection service 104, from a calling process of the customer 130. The service request may be configured to be routed through the fault injection service 104 before being optionally sent to the virtual service 140. More specifically, the service requests may be sent to the appropriate host address (e.g., internet protocol (IP) address and port) set to receive services requests for testing. The fault injection service 104 may be a user-controlled fault injection service, and the service request may be received at the fault injection service 104. A determination, by the fault injection service 104, may be made whether to modify, corrupt, drop, or fail the service request received by the fault injection service 104. Specifically, the test case module 110 may include one or more test cases the fault injection service may use to modify a result of the service request being modified, corrupted, dropped, or failed. The corruption engine module 112 may be used to corrupt the service request and inject corrupted data or random data into the service request by corrupting the parameters in the service request or corrupting the service request itself.

The randomizer module 106 may be used to randomly select which service request may be dropped, modified, corrupted or failed. That is, the randomizer module 106 may be used to execute random failures of service requests using the using the fault injection service 104. For example, the random failures may randomly fail one or more service requests or one or more persistent storage requests at one or more random times and at random sequences or random intervals during a selected time period. For example, the fault injection service 104 may be set to randomly have 10 failures in 10 minutes while an application or process is making service request. In most cases, the service request may be passed through to the virtual service 140 without changes to the service request. It should be noted that the generation of "randomness" by the randomizer module 106 may be true randomness. Alternatively, the generation of "randomness" by the randomizer module 106 may not be truly random, wherein the randomizer module 106 can function as a pseudorandom number generator (PRNG) and randomly generate randomness as an algorithmic pseudo-random number generator. In short, the randomness may be generated using one or more of a variety of randomness techniques.

The service request may be failed by the fault injection service 104 when the service request has been selected to fail and a failure status for the service request may be returned. In some cases, the service request may be sent to the virtualized service 140 in the service provider environment 102 or may be sent to an emulated service using the emulation module 114 controlled by the fault injection service 104 when the service request has been modified. The results of the service request may be reported to the calling process as received via the user-controlled fault injection service. For example, in one aspect, the emulation module 114 may emulate the virtual service 140 for testing purposes. As described, the fault injection service 104 may allow the service requests (e.g., an API service request) to be forwarded to the virtual service 140. Also, the fault injection service 104 may modify the service request using the emulation module 114 for testing the result of what may happen if the service request is modified and then sent to an emulated version of the virtual service in an emulated environment since the emulation module 110 may emulate the virtual service 140.

In one example configuration, the protocol used for the API calls (e.g., service request and/or API service calls) may be a representation state transfer ("REST") API. Similarly, the services may use a software application that communicates: over HTTP (Hyper Text Transfer Protocol), XML (extensible Markup Language) standards including SOAP (Simple Object Access Protocol), WSDL (Web Services Description Language), JavaScript Object Notification (JSON), and/or UDDI (Universal Description, Discovery, and Integration). In one aspect, the virtual service or web service may refer to a service that may be invoked through the Internet. Also, the web services, for example, may include computing services, networking services, content delivery services, database services, deployment services, management services, applications services, and the like. The API may be responsible for managing requests and responses between the sending service and the receiving service. In one aspect, the API may also be a customer defined API.

Thus, by using the components, modules, devices, and/or services provided in FIG. 1, the present technology provides solutions for systems to use a mediated fault invocation service where a service request may be randomly modified or failed in order to test the use of a virtualized service and/or emulated persistent storage device in an application or process as a result of the modified and/or failed service request. In this way, the user-controlled mediated fault injection service may emulate virtual services and provide on-demand simulated failures of any service provider environment components. The user-controlled mediated fault injection service may provide the needed granularity and flexibility for failure testing that customers and partners of a service provider environment desire in order to architect resilient solutions in fungible environments.

For example, in operation, such as for testing, simulating failures, making modifications, and providing quality assurance (Q/A) of a service request from a calling application or calling process, the fault injection service 104 may 1) receive a service request (e.g., an API service request), from a calling process of the customer 130, directed to the virtual service 140. The fault injection service 104 may 2) determine whether to fail, modify, and/or forward the service request. The fault injection service 104 may 3) send the service request to the virtual service if the service request has been selected to be modified or block the service request (e.g., prohibit the service request from reaching the virtual service 140) if the service request has been selected to be blocked. The fault injection service 104 may return the results of the service request by passing the results from the virtual service or emulated persistent storage device back to the calling process. In one aspect, the fault injection service 104 may provide a stand-alone service to simulate testing a modification and/or failure of the service requests directed to a virtual service for the service provider environment 102. The customer may receive the results of the modified or failed service requests directed to a virtual service in a testing environment for the service provider environment 102. That is, the test results provide actual, real results of what may happen in the service provider environment 102 when the service request is modified, blocked, or failed by the fault injection service 104 simulating a failure or problem with the service provider environment 102.

Furthermore, one or more test cases may be provided (as defined by a user) with one or more testing parameters and randomized and/or repeating testing sequences. For example, a selected test case may be executed at defined times and/or at a random time intervals of, for example, 300 times per 24-hour period. Moreover, regression-testing operations may occur using the fault injection service. The fault injection service may execute regression tests by failing or modifying the service request to insure that the modification or failure of the service request not only behaves as expected, but the modification or failure of the service request does not inadvertently cause problems in functions and/or services of service provider environment that had otherwise worked correctly when previously tested.

Figure 2:
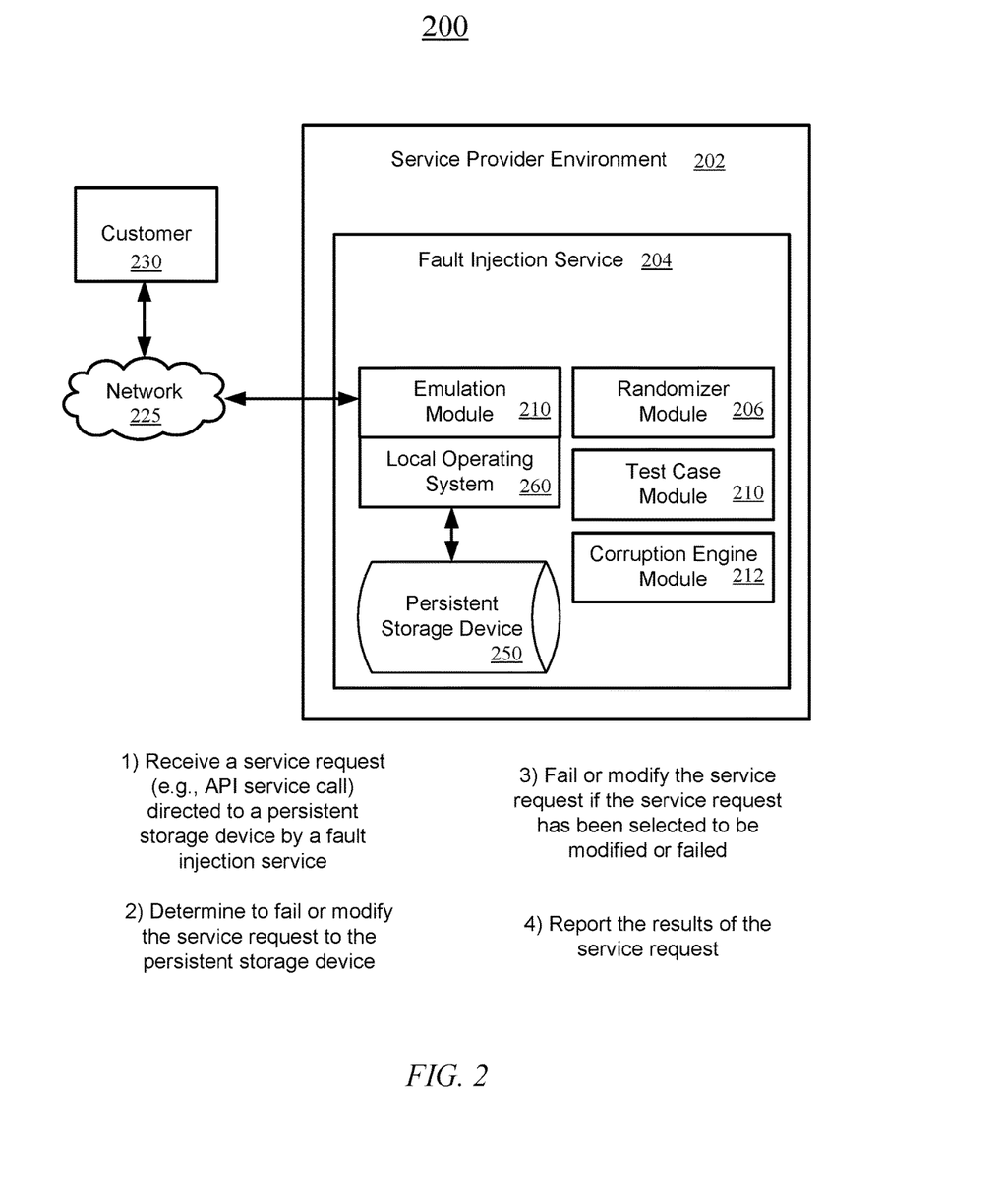
FIG. 2 illustrates a system for a mediated fault invocation service for a persistent storage device in a service provider environment according to an example of the present technology.

FIG. 2 illustrates the system 200 for a mediated fault invocation service for a virtualized service in a service provider environment. In one aspect, each of the components, modules, and/or services described in FIG. 1 may also apply to the components, modules, and services of FIG. 2. Also, one or more of the operations and steps of FIG. 1 may also be included in one or more operations or actions of FIG. 2.

Similar to FIG. 1, the system 200 may include a customer 230 (the customer 230 may include a calling service), a network 225, and a service provider environment 202, which may provide virtualized computing services (i.e., virtualized computing, virtualized storage, virtualized networking, etc.) to the customer 230 (e.g., a service such as for example, a web application). More specifically, the service provider environment 202 may provide virtualized computing, virtualized storage, virtualized networking and other virtualized services that are executing on a hardware substrate. For example, the fault injection service 204 may execute on a computing instance in the service provider environment. Also, the service provider environment 202 may provide data communication between the customer 230 by way of the network 225 that may include a virtual network that is within the service provider environment 202 or other suitable networks, etc. The service provider environment 202 may include a fault injection service 204 and a virtual service. Alternatively, the fault injection service 204 may be a stand-alone system remote from the service provider environment 202, and/or the fault injection service 104 may be located on a network owned by the customer 230.

The fault injection service may include a randomizer module 206, a test case module 214, an emulation module 210 (e.g., a test kernel), a corruption engine module 212, a persistent storage device 250 (e.g., a persistent storage device for emulation purposes), and a local operating system 260 (e.g., to provide access to an in /proc portion of a file system). In one aspect, the fault injection service 204 may be a stand-alone service in the service provider environment 202. Alternatively, the fault injection service 204 may be external to the service provider environment 202. That is, the fault injection service for the service provider environment may be in an off-premises environment belonging to a customer.

In operation, by way of example, a service request that is directed to the persistent storage device 250 may be received, by the fault injection service 204, from a calling process of the customer 230. The fault injection service 204 may be a user-controlled fault injection service. That is, a customer or user may control the state of failures for services or persistent storage devices or control the modifications injected by the fault injection service. After the customer has provided the fault settings, a determination may be made by the fault injection service 204 as to whether to modify, corrupt, or fail the service request received by the fault injection service 204.

The test case module 214 may include one or more test cases which the fault injection service 204 may use to test a result of the service request being modified, corrupted or failed. The corruption engine module 212 may be used to corrupt the service request or corrupt parameters in the service request. The randomizer module 206 may be used to randomly select which service request directed to the persistent storage device 250 may be modified, corrupted or failed. That is, the randomizer module 206 may be used to execute a random failure mode using the using the fault injection service 204, wherein the random failure mode randomly fails one or more services or one or more persistent storage requests at one or more random times and at random sequences during a selected time period. The randomizer module 206 may also select random service request parameters to drop, modify or corrupt.

The fault injection service 204 may be a user-controlled fault injection simulation service using the emulation module 210, to emulate one or more services of a persistent storage device 250 as the persistent storage device is expected to operate in the service provider environment 202. The fault injection service 204 may be invoked to operate in a failure mode in order to simulate on-demand failures of the one or more services of the persistent storage device 250 or the persistent storage device 250 as it would operate in the service provider environment 202. In other words, the emulation of the persistent storage device may occur solely on the fault injection service 204 or the emulation of the persistent storage device may use a persistent storage device in the service provider environment 202 and the fault injection service may intercept service requests to the persistent storage device in any type of emulation mode.

For example, in one aspect, the fault injection service 204 may fail, block, or modify one or more Application Programming Interface (API) service calls of the customer directed to the persistent storage device 250. The fault injection service 204 may execute a random failure operation mode using the randomizer module 106, wherein the random failure mode randomly fails or modifies one or more services or one or more persistent storage requests at one or more random times and at random sequences during a selected time period. The fault injection service 204 may activate or deactivate the one or more services of the persistent storage device 250 or the persistent storage device 250 being used in the service provider environment 202 randomly, according to the randomizer module 106, during execution of the failure mode. In one aspect, the fault injection service 204 may prohibit messages and/or other service requests directed to the deactivated persistent storage device 250 from being communicated using the fault injection simulation service during execution of the failure mode.

The fault injection service 204 may execute the emulation module 210 (e.g., a modified operating system kernel or test kernel used for testing or emulation) on a computing instance to emulate the persistent storage device 250 by simulating the persistent storage device 250 operations using the emulation module 210 (e.g., a test kernel) for changing a state of the persistent storage device 250. That is, the emulation module 210 (e.g., test or emulation kernel) allows for "killing" the code path to the persistent storage device 250 and the emulation module 210 may take over the persistent storage device layer. The emulation module 210 may provide one or more files to the local operation system 260 (e.g., located in an in /proc file system) in order to store the state and enable state changes to be made for one or more services of the persistent storage device and/or the state of the persistent storage device 250. For example, the fault injection service 204 may indicate the service request destined to the persistent storage device 250 is to fail. The emulation module 210 (e.g., a test or emulation kernel) on the computing instance receives a service request and checks the state of the persistent storage device 250 by reading the state stored in the /proc file of the local operating system 260. The emulation module 210 (e.g., the test or emulation kernel) may then fail one or more service requests destined for the persistent storage device 250. In one aspect, the emulation module 210 may deactivate the persistent storage device 250.

As discussed, the fault injection service 204 may use the local operation system 260 (e.g., an in/proc file system) to read the state of the persistent storage device 250 but other types of state storage configurations may be used. A specialized database may be created on the local operating system 260 to store the state. The fault injection service 204 may execute the failure mode using the emulation module 210 (e.g., a test kernel) to intercept and fail one or more persistent storage requests sent to the persistent storage device 250. The fault injection service 204 may prohibit responses from the persistent storage devices 250 via the emulation module 210 during execution of the failure mode. The fault injection service 204 may persist data in a dynamic random access memory (DRAM) or alternative persistent storage device that is not being emulated, but the alternative persistent storage device may be used for emulation of the persistent storage device being tested. Accordingly, the fault injection service 204 may track a simulated, user controlled health state or randomized health state of the one or more services of the persistent storage device 250 or the persistent storage device 250 itself using the fault injection service 204.

For example, in operation, as depicted in FIG. 2, the fault injection service may 1) receive a service request (e.g., an API service request), from a calling process of the customer 130, directed to the persistent storage device 250. The fault injection service 104 may 2) determine whether to fail or modify the service request. The fault injection service 104 may 3) fail or modify the service request to the persistent storage device if the service request has been selected to be failed or modified. The fault injection service 104 may report the results of the service request according to the failed or modified service request.

Figure 3A:
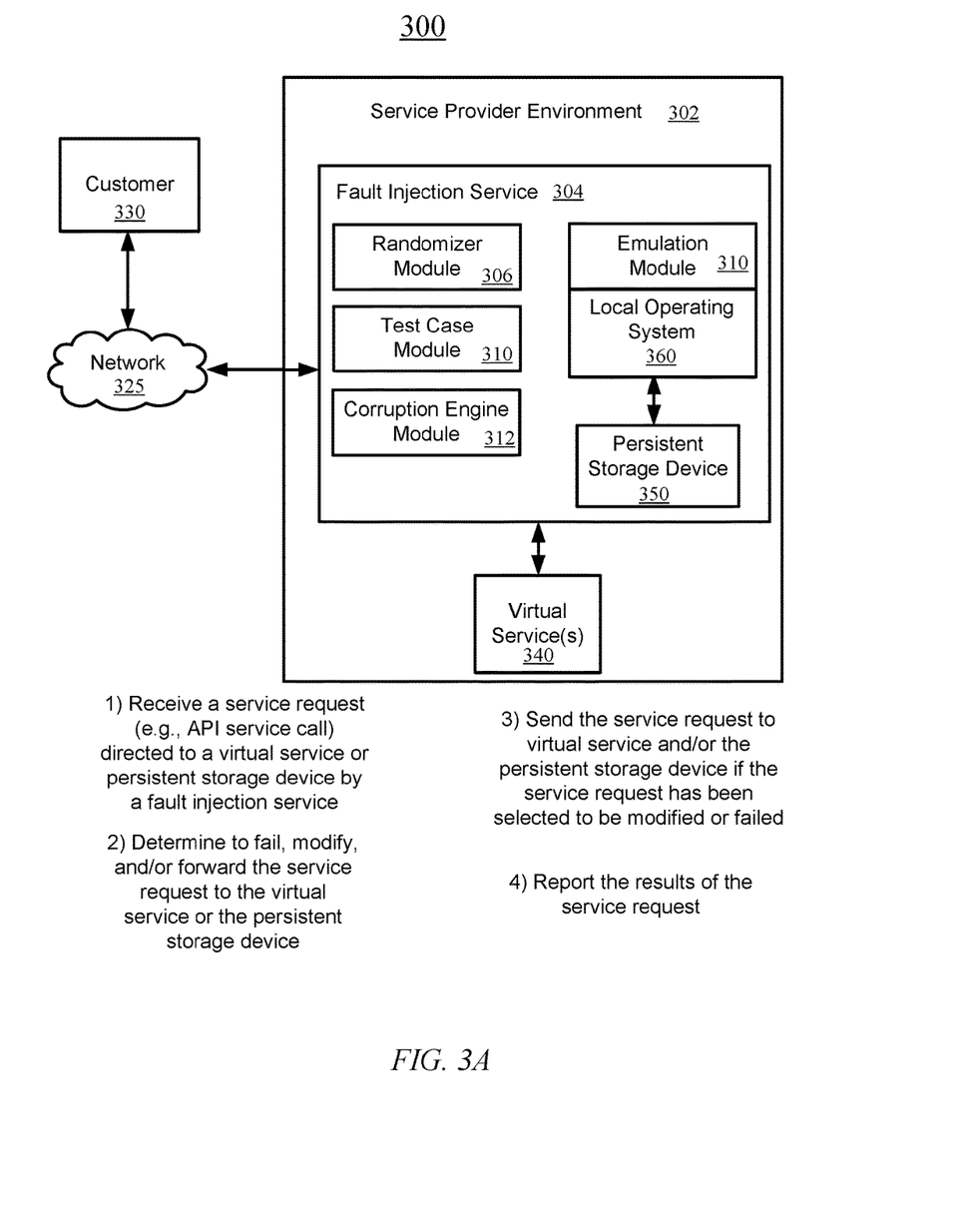
FIG. 3A-3B illustrates systems for a mediated fault invocation service for virtualized services or a persistent storage device in a service provider environment according to an example of the present technology.
Figure 3B:
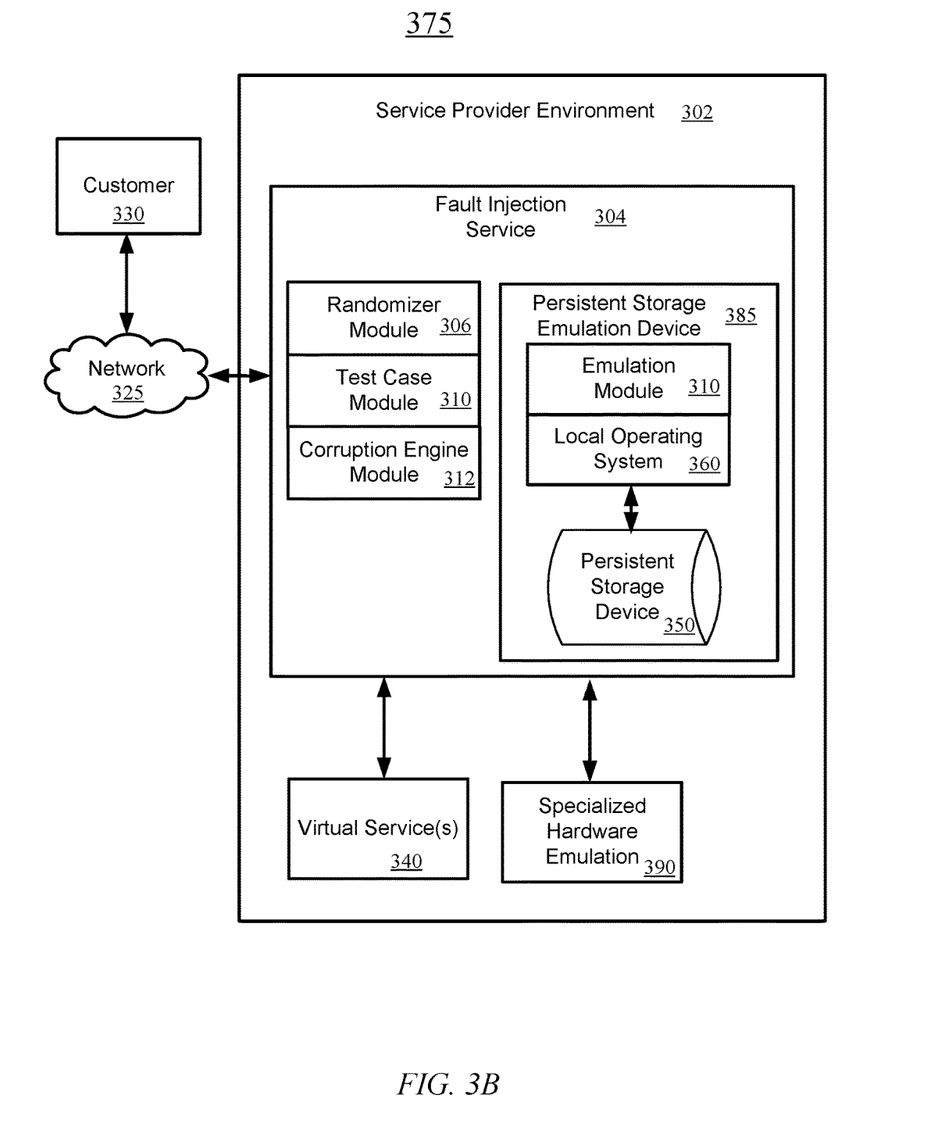

FIG. 3A-3B illustrate systems 300 and 375 for a mediated fault invocation service for a virtual service and persistent storage device in a service provider environment according to an example of the present technology. In one aspect, each of the components, modules, and/or services described in FIGS. 1-2 may also apply to the components, modules, and services of FIG. 3. Also, one or more of the operations or actions of FIGS. 1-2 may also be included in one or more operations or actions of FIGS. 3A-3B.

Similar to FIGS. 1-2, the system 300 and system 375 in FIGS. 3A-3B may include a customer 330 (the customer 330 may include a calling service), a network 325, and a service provider environment 302, which may provide virtualized computing services (i.e., virtualized computing, virtualized storage, virtualized networking, etc.) to the requesting services (e.g., customers 330). More specifically, the service provider environment 302 may provide virtualized computing, virtualized storage, virtualized networking and other virtualized services that are executing on a hardware substrate. Also, the service provider environment 302 may provide data communication between the customer 330 (e.g., a sending service such as for example, a web application) by way of the network 325 that may include a virtual network within the service provider environment 302 or other suitable networks, etc. The service provider environment 302 may include a fault injection service 304, a virtual service 340, and a persistent storage device 350 may be located within the fault injection service 304. Alternatively, the fault injection service 304 may be a stand-alone system remote from the service provider environment 302, and/or the fault injection service 104 may be located on the customer 330. The fault injection service 304 may include a randomizer module 306, a test case module 314, an emulation module 310, and a corruption engine module 312. The fault injection service 304 may be in data communication between the customer 330 by way of the network 325 and the virtual service. In one aspect, the fault injection service 304 may be a stand-alone service in the service provider environment 302. Alternatively, the fault injection service 304 may be included with the virtual services 340.

More specifically, as depicted in the system of FIG. 3A or 3B, the fault injection service 304 may include a persistent storage emulation device 385 that is internal or external to a system 375. The persistent storage emulation device 385 may include the emulation module 310, a local operating system 360, (which can provide access to a /proc portion of a file system) and/or a persistent storage device 350 accessed by the local operation system 360.

In FIG. 3B, a specialized hardware emulation module 390 may be provided to simulate failures of other types specialized hardware which are not provided in a service provider system and are not a persistent storage device. The types of specialized hardware that may be emulated may include, but are not limited to: 3D printers, display systems, 3D-printing systems, robotics, and/or other types of specialized hardware defined by users or system administrators. This additional emulation module may enable simulated testing for specialized hardware devices.

In operation, by way of example only, a service request that is directed to the virtualized service 340 or the persistent storage device 350 may be received, by the fault injection service 304, from a calling process of the customer 330. A determination, by the fault injection service 304, may be made whether to modify, corrupt, or fail the service request as received by the fault injection service 304. Specifically, the test case module 310 may include one or more test cases the fault injection service 304 may use to test a result of the service request being dropped, modified, corrupted or failed. The corruption engine module 312 may be used to corrupt the service request. The randomizer module 306 may be used to randomly select which service request may be dropped, modified, corrupted or failed. That is, the randomizer module 306 may be used to execute a random failure mode using the using the fault injection service 304, wherein the random failure mode randomly fails one or more service requests (e.g., services) or one or more persistent storage requests at one or more random times and at random sequences during a selected time period.

The service request may be blocked or failed by the fault injection service 304 when the service request has been selected to fail. The service request may also be sent through to or forwarded to the virtualized service 340, the persistent storage device 350 in the service provider environment 302, or an emulated service using the emulation module 310 controlled by the fault injection service 304 when the service request has been modified or remains unmodified. The results of the service request may be reported to the customer as received via the user-controlled fault injection service.

In operation, as in FIG. 3A, the user-controlled fault injection service 304 may 1) receive a service request that is directed to the virtualized service 340 or the persistent storage device 350, from a calling process or calling application (e.g., the customer 330) via the network 325, wherein the service request is received at the user-controlled fault injection service 304, and the virtualized service 340 and the persistent storage device 350 may be located in a service provider environment 302. The user-controlled fault injection service 304 may 2) determine whether to modify, fail, and/or forward the service request as received by the user-controlled fault injection service 304 to the virtualized service 340 and/or the persistent storage device 350. The user-controlled fault injection service 304 may 3) send the service request to the virtualized service 340 and/or the persistent storage device 350 if the service request has been selected to be modified and/or block the service request (e.g., prohibit the service request from reaching the virtualized service 340 and/or the persistent storage device 350) if the service request has been selected to be failed or blocked. The fault injection service 104 may report the results of the service request to the calling process (e.g., the customer 330) as received via the user-controlled fault injection service 304.

Figure 4:
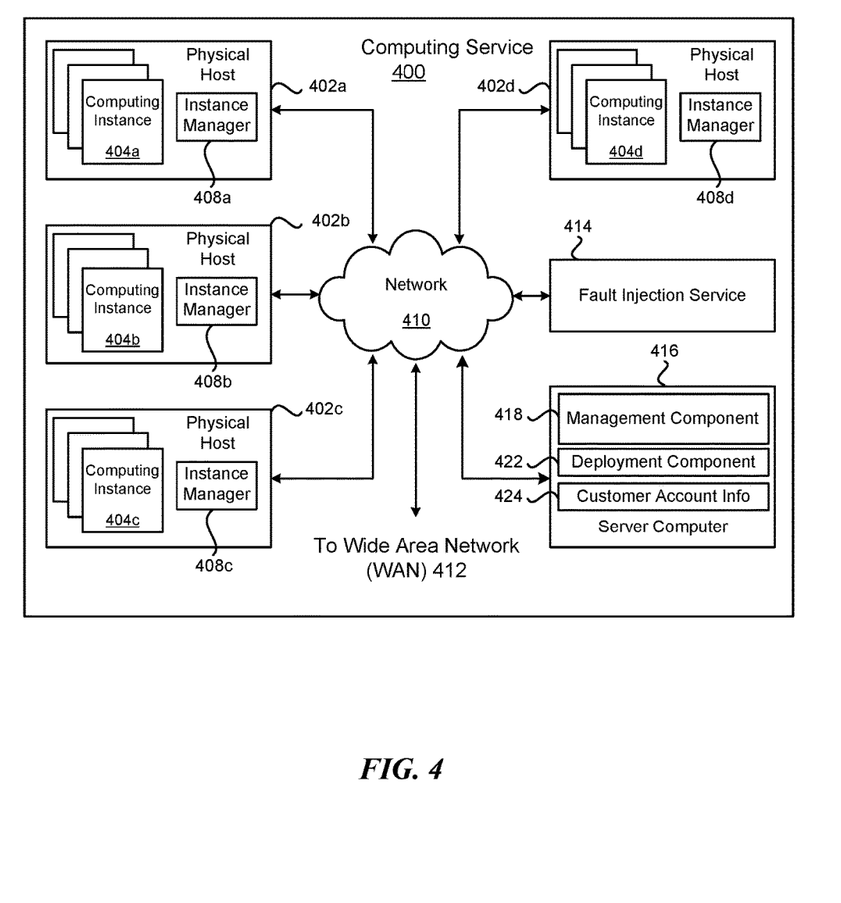
FIG. 4 is a block diagram that illustrates an example computing service environment that includes a fault injection service according to an example of the present technology.

FIG. 4 is a block diagram illustrating an example computing service 400 that may be used to execute software services for providing a user-controlled fault injection service in a computing service environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used to execute software services for providing a user-controlled fault injection service in a computing service environment. For example, a server computer 414 may execute a user-controlled fault injection service in a computing service environment. One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404*a*-*d* and make changes to the configuration of the computing instances 404*a*-*d*.

A deployment component 422 may be used to assist customers in the deployment of computing instances 404*a*-*d*. The deployment component 422 may have access to account information associated with the computing instances 404*a*-*d*, such as the name of an owner of the account, credit card information, country of the owner, etc. The deployment component 422 may receive a configuration from a customer that includes data describing how computing instances 404*a*-*d* may be configured. For example, the configuration may include an operating system, provide one or more applications to be installed in computing instances 404*a*-*d*, provide scripts and/or other types of code to be executed for configuring computing instances 404*a*-*d*, provide cache logic specifying how an application cache may be prepared, and other types of information. The deployment component 422 may utilize the customer-provided configuration and cache logic to configure, initialize, and launch computing instances 404*a*-*d*. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a*-*d*, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
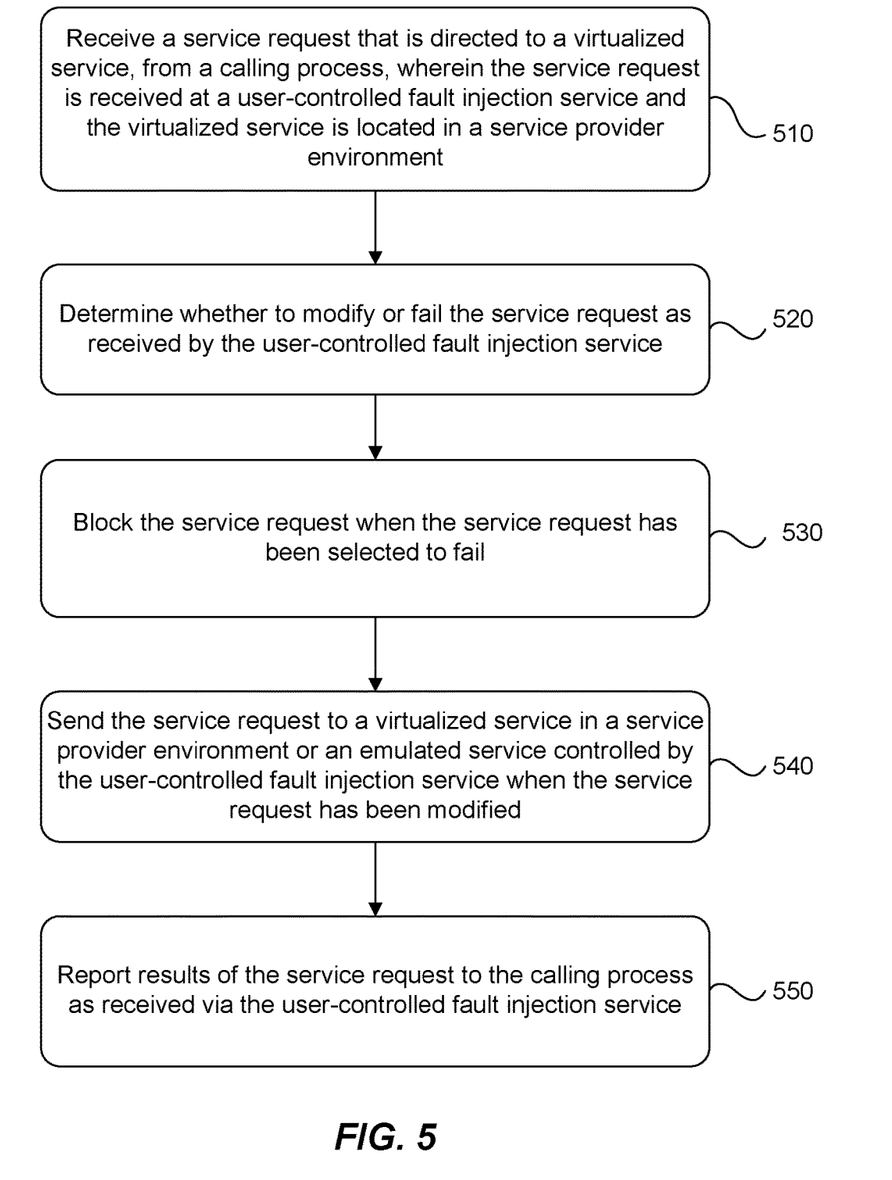
FIG. 5 is a flowchart of an example method for mediated fault invocation in a service provider environment according to an example of the present technology.

FIG. 5 is a flowchart of an example method for mediated fault invocation in a service provider environment according to an example of the present technology. The functionality may be implemented as a method and executed as instructions on a machine, where the instructions are included on at least one computer readable medium or one non-transitory machine-readable storage medium. For example, starting in block 510, a service request that is directed to a virtualized service, may be received from a calling process. The service request may be received at a user-controlled fault injection service and the virtualized service is located in a service provider environment. A determination may be made whether to modify or fail the service request as received by the user-controlled fault injection service, as in block 520. The service request may be blocked when the service request has been selected to fail, as in block 530. The service request may be sent to a virtualized service in a service provider environment or an emulated service controlled by the user-controlled fault injection service when the service request has been modified, as in block 540. The results of the service request may be reported to the calling process as received via the user-controlled fault injection service, as in block 550.

Figure 6:
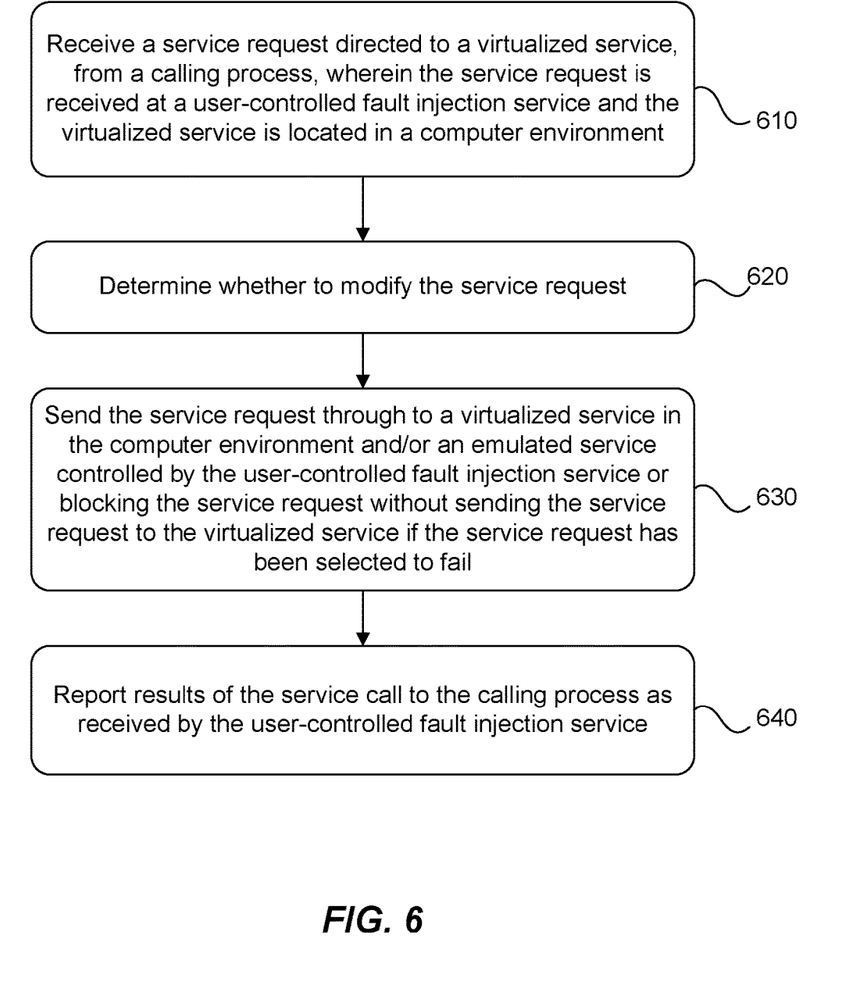
FIG. 6 is a flowchart of an additional example method for mediated fault invocation in a service provider environment according to an example of the present technology.

FIG. 6 is a flowchart of an additional example method for mediated fault invocation in a service provider environment according to an example of the present technology. The functionality may be implemented as a method executed as instructions on a machine, where the instructions are included on at least one computer readable medium or one non-transitory machine-readable storage medium. Starting in block 610, a service request that is directed to a virtual service may be received from a calling process. A determination may be made as to whether to modify the service request, as in block 620. The service request may be sent through to a virtualized service in a service provider environment or an emulated service controlled by the user-controlled fault injection service or blocking the service request without sending the service request to the virtualized service if the service request has been selected to fail, as in block 630. The results of the service request may be reported to the calling process as received by the user-controlled fault injection service, as in block 640.

Figure 7:
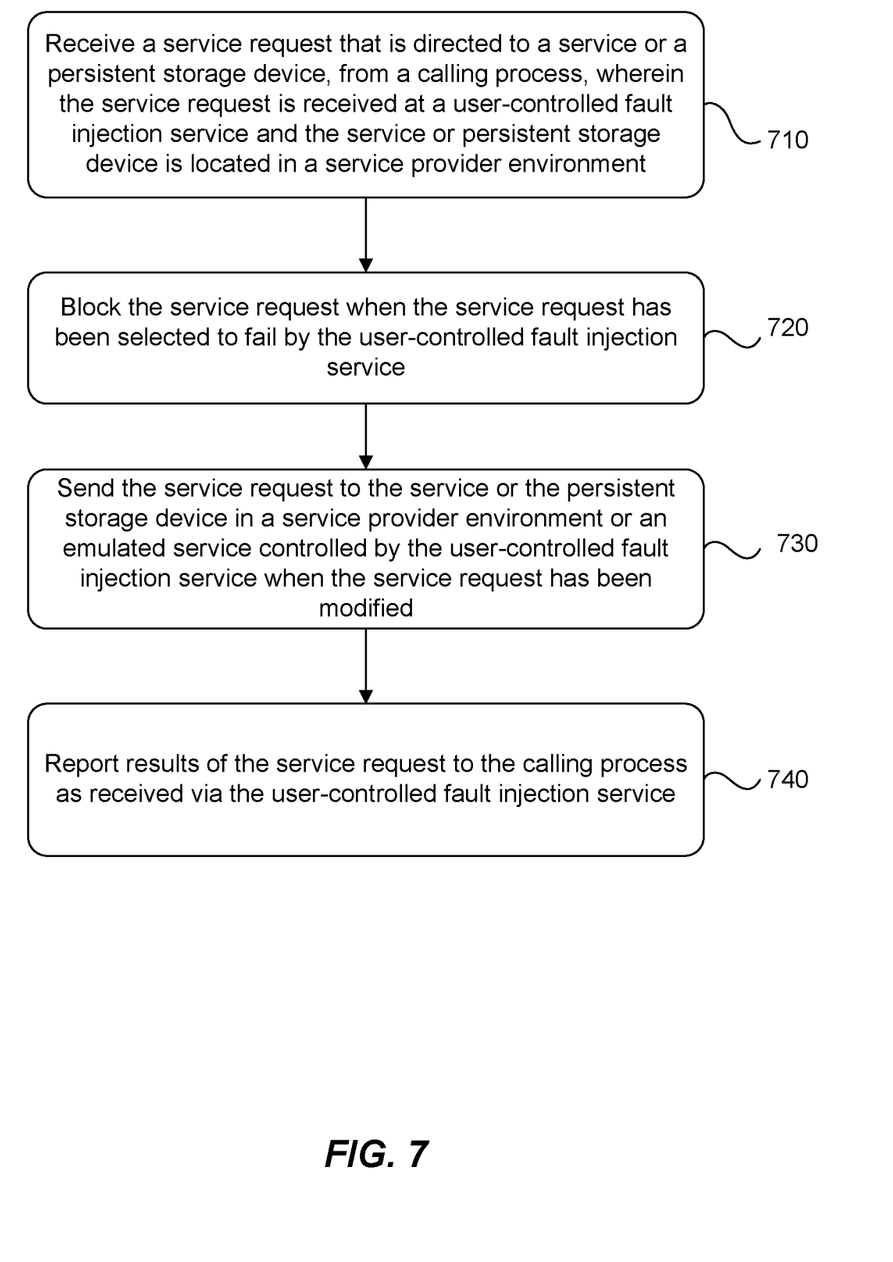
FIG. 7 is a flowchart of an additional example method for mediated fault invocation for virtual services or persistent storage devices in a service provider environment according to an example of the present technology.

FIG. 7 is a flowchart of an additional example method for mediated fault invocation in a service provider environment according to an example of the present technology. The functionality may be implemented as a method executed as instructions on a machine, where the instructions are included on at least one computer readable medium or one non-transitory machine-readable storage medium. Starting in block 710, a service request that is directed to a service (which may be a virtualized service) or a persistent storage device, may be received from a calling process, wherein the service request is received at a user-controlled fault injection service and the service or persistent storage device is located in a service provider environment. The service request may be blocked when the service request has been selected to fail by the user-controlled fault injection service, as in block 720. The service request may be sent to a service or the persistent storage device in a service provider environment or an emulated service controlled by the user-controlled fault injection service when the service request has been modified, as in block 730. The results of the service request may be reported to the calling process as received via the user-controlled fault injection service, as in block 740.

In one aspect, in conjunction with and/or as part of at least one block of FIGS. 5-7, the operations of the figures may include each of the following. In one aspect, the user-controlled fault injection service may be invoked to operate in a failure mode in order to simulate on-demand failures of the one or more services or persistent storage devices of the service provider. The user-controlled fault injection service may fail, block, or modify an Application Programming Interface (API) service call destined to the service provider using the user-controlled fault injection service during execution of the failure mode, wherein the user-controlled fault injection service relays the API service call to the service provider environment or fails the one or more API service calls. The user-controlled fault injection service may fail, block, or modify one or more persistent storage requests sent to a persistent storage device using the user-controlled fault injection service during execution of the failure mode. The user-controlled fault injection service may activate or deactivate the access to one or more services or persistent storage devices of the service provider randomly using the user-controlled fault injection service during execution of the failure mode.

In one aspect, the user-controlled fault injection service may execute a random failure mode using the user-controlled fault injection service, wherein the random failure mode randomly fails one or more services or one or more persistent storage requests at one or more random times and at random sequences during a selected time period. The user-controlled fault injection service may execute a testing kernel or modified operating system kernel to create the user-controlled fault injection service on a computing instance to emulate a persistent storage device and the persistent storage device operations using a local operating system for changing a state of the persistent storage device. The user-controlled fault injection service may execute the failure mode using the testing kernel to intercept and fail one or more persistent storage requests sent to the persistent storage device. The user-controlled fault injection service may prohibit block responses from the persistent storage devices by the testing kernel during execution of the failure mode. Data for a persistent storage device being tested and emulated may be persisted in a dynamic random access memory (DRAM) or alternative persistent storage device that is not being emulated.

In one aspect, the operations of FIGS. 5-7 may include the user-controlled fault injection service for failing, blocking, or modifying one or more Application Programming Interface (API) service calls of the service provider using the user-controlled fault injection service. The user-controlled fault injection service may fail or modify data in the one or more Application Programming Interface (API) service calls of the service provider using the user-controlled fault injection service during execution of the failure mode. The user-controlled fault injection service may fail or modify one or more Application Programming Interface (API) service calls of the service provider using the user-controlled fault injection service and relay the API service call to the service provider environment via the fault injection service. The user-controlled fault injection service may fail or modify one or more persistent storage requests sent to a persistent storage device of the service provider using the user-controlled fault injection service. The user-controlled fault injection service may simulate the activation or deactivation of the one or more services or persistent storage devices of the service provider randomly using the user-controlled fault injection service during execution of the failure mode. In one configuration, the user-controlled fault injection service may provide the user-controlled fault injection service for the service provider in an off-premises environment.

In one aspect, the service provider environment may include one or more services executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 8:
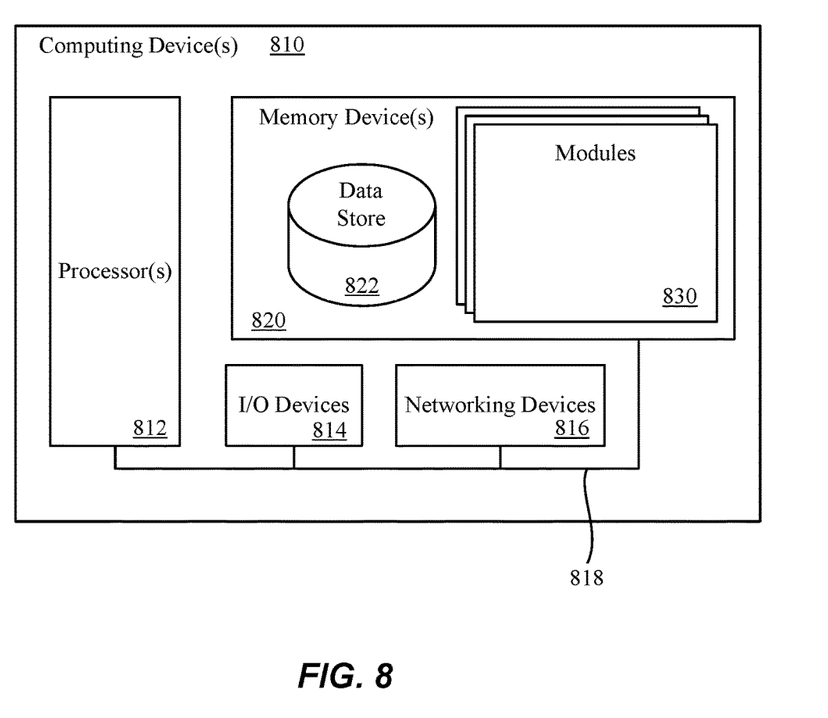
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology. Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for providing mediated fault invocation for a computing service environment, the method comprises:
    under control of at least one processor and memory configured with executable instructions that:
    receive a service request that is directed to a virtualized service, from a calling process, wherein the service request is received at a user-controlled fault injection service and the virtualized service is located in a service provider environment;
    determine whether to fail or modify the service request as received by the user-controlled fault injection service using a random failure mode that randomly fails or modifies the service request;
    block the service request when the service request has been selected to be failed;
    send the service request to the virtualized service in the service provider environment or an emulated service controlled by the user-controlled fault injection service when the service request has been modified; and
    report results of the service request to the calling process as received via the user-controlled fault injection service.

2. The method of claim 1, wherein the executable instructions block, fail or modify an Application Programming Interface (API) service request destined to the service provider using the user-controlled fault injection service during execution of a failure mode, wherein the user-controlled fault injection service relays the API service request to the service provider environment or fails the API service request.

3. The method of claim 1, wherein the executable instructions further fail or modify a persistent storage request sent to a persistent storage device of the service provider environment using the user-controlled fault injection service during execution of a failure mode.

4. The method of claim 1, wherein the executable instructions further simulate activation or deactivation of the virtualized service or a persistent storage device of the service provider environment randomly using the user-controlled fault injection service during execution of a failure mode.

5. The method of claim 1, wherein the random failure mode further randomly fails one or more virtualized services or one or more persistent storage requests at one or more random times and at random sequences during a selected time period.

6. The method of claim 1, wherein the executable instructions further persist data while testing a persistent storage device being emulated in a dynamic random access memory (DRAM) or alternative persistent storage device not being emulated.

7. A method for providing mediated fault invocation for a service provider in a computing service environment, the method comprises:
under control of at least one processor and memory configured with executable instructions that:
receive a service request directed to a service, from a calling process, wherein the service request is received at a fault injection service and the service is located in a computing environment;
determine whether to modify the service request using a random failure mode that randomly modifies the service request;
send the service request through to a service in the computing environment or an emulated service controlled by the fault injection service; and
report results of the service request to the calling process as received by the fault injection service.

8. The method of claim 7, wherein the executable instructions further fail or block one or more Application Programming Interface (API) service requests to the computing environment using the fault injection service.

9. The method of claim 7, wherein the executable instructions further fail or modify data in one or more Application Programming Interface (API) service requests for the computing environment using the fault injection service during execution of a failure mode.

10. The method of claim 7, wherein the executable instructions further fail or modify one or more Application Programming Interface (API) service requests of the service provider using the fault injection service and relay the API service requests to the computing environment via the fault injection service.

11. The method of claim 7, wherein the executable instructions further fail or modify one or more persistent storage requests sent to a persistent storage device of the computing environment using the fault injection service.

12. The method of claim 7, wherein the executable instructions further simulate activation or deactivation of the one or more services or persistent storage devices of the computing environment randomly using the fault injection service during execution of a failure mode.

13. The method of claim 12, wherein the executable instructions further provide the fault injection service in an off-premises environment.

14. The method of claim 7, wherein the random failure mode further randomly fails or modifies one or more service requests or one or more persistent storage requests at one or more random times and at random sequences during a selected time period.

15. The method of claim 7, wherein the executable instructions further:
execute a testing kernel for the fault injection service on a computing instance to emulate a persistent storage device by emulating persistent storage device operations using a local operating system and simulating changing a state of the persistent storage device;
execute a failure mode by the testing kernel to intercept and fail one or more persistent storage requests sent to the persistent storage device; and
prohibit responses from the persistent storage devices by the testing kernel during execution of the failure mode.

16. The method of claim 7, wherein the executable instructions further persist data in a dynamic random access memory (DRAM) or alternative persistent storage device not being emulated.

17. A computer implemented method mediated fault invocation for a computing service environment, the method comprises:
under control of at least one processor and memory configured with executable instructions that:
receive a service request that is directed to a virtualized service or a persistent storage device, from a calling process, wherein the service request is received at a user-controlled fault injection service and the virtualized service or persistent storage device is located in a service provider environment;
determine whether to fail or modify the service request by the user-controlled fault injection service using a random failure mode that randomly fails or modifies the service request;
block the service request when the service request has been selected to be failed by the user-controlled fault injection service;
send the service request to a virtualized service in a service provider environment or an emulated service that is a persistent storage device controlled by the user-controlled fault injection service when the service request has been modified; and
report results of the service request to the calling process as received via the user-controlled fault injection service.

18. The computer implemented method of claim 17, wherein the executable instructions further:
determine to fail or modify the service request by the user-controlled fault injection service; and
provide the fault injection service in an off-premises environment.

19. The computer implemented method of claim 17, wherein the random failure mode further randomly fails or modifies one or more service requests or one or more persistent storage requests at one or more random times and at random sequences during a selected time period.

20. The computer implemented method of claim 17, wherein the executable instructions further:
execute a testing kernel of the user-controlled fault injection service on a computing instance to emulate a persistent storage device by emulating persistent storage device operations using a local operating system and simulating changing a state of the persistent storage device; and
execute a failure mode by the testing kernel to intercept and fail one or more persistent storage requests sent to the persistent storage device.

* * * * *